(12) United States Patent
Nishitani et al.

(10) Patent No.: US 6,231,211 B1
(45) Date of Patent: May 15, 2001

(54) VEHICLE LAMP HAVING A WATERPROOFING ANNULAR GASKET

(75) Inventors: Norihiro Nishitani; Takayoshi Goto, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/283,975

(22) Filed: Apr. 1, 1999

(30) Foreign Application Priority Data

Apr. 2, 1998 (JP) .................................................. 10-089625

(51) Int. Cl.$^7$ ...................................................... F21V 29/00
(52) U.S. Cl. ........................... 362/267; 362/546; 362/548; 362/549; 362/362
(58) Field of Search ...................................... 362/294, 158, 362/459, 487, 497, 546, 548, 549, 362, 267, 374, 375; 277/590; 215/238

(56) References Cited

U.S. PATENT DOCUMENTS

| | | | |
|---|---|---|---|
| 5,072,952 | * 12/1991 | Irrgeher et al. .............................. | 277/229 |
| 5,402,325 | * 3/1995 | Wisler et al. ............................ | 362/519 |
| 5,416,682 | * 5/1995 | Bromhall .............................. | 362/294 |
| 5,461,552 | * 10/1995 | Tillery .................................. | 362/188 |
| 5,492,336 | * 2/1996 | Barna et al. .............................. | 277/1 |
| 5,747,920 | * 5/1998 | Devir et al. ...................... | 313/318.09 |

\* cited by examiner

Primary Examiner—Thomas M. Sember
Assistant Examiner—Ismael Negron
(74) Attorney, Agent, or Firm—Sughrue, Mion, Zinn, Macpeak & Seas, PLLC

(57) ABSTRACT

A vehicle lamp with a lamp body and a bulb socket portion placed through a bulb fitting hole in the lamp body. A waterproofing annular gasket placed between a flange of the bulb socket and the outer periphery of the bulb fitting hole provides a waterproof seal to the lamp body. The lamp body is integrally formed with a lens such that the bulb fitting hole is the only opening to the outside environment. A transverse cross section of the gasket reveals a sideways gourd-like structure that improves the seal between the flange of the bulb socket and the peripheral edge of the bulb fitting hole.

16 Claims, 5 Drawing Sheets

VEHICLE LAMP HAVING A WATERPROOFING ANNULAR GASKET

BACKGROUND OF THE INVENTION

1. Field of the Invention

The present invention relates to a vehicle lamp fabricated by fitting a bulb as a light source into a bulb fitting hole provided in a lamp body by bayonet engagement, and fitting an annular gasket in between a flange portion provided on the periphery of a bulb socket and the peripheral edge portion of the bulb fitting hole whereby to seal the bulb fitting hole, and more particularly to a vehicle lamp having a lamp body and a front lens which are integrally formed by blow molding.

2. Related Art

In order to decrease the number of parts constituting a lamp, a conventional vehicle lamp is constructed as shown in FIG. 11 through the steps of integrally forming a lamp body portion 2 and a front lens portion 3 by blow molding into a hollow body lens unit 1, fitting a bulb 5 as a light source into a bulb fitting hole 4 formed in the lamp body portion 2 of the body lens unit 1 by bayonet engagement and fitting an annular gasket 7 in between a flange portion 6a provided on the periphery of a bulb socket 6 and the peripheral edge portion 4a of the bulb fitting hole whereby to seal the bulb fitting hole 4.

The gasket 7 has a transverse cross section so that its wall thickness is gradually reduced toward the inner peripheral side so as to make easy the mounting of the gasket on the bulb socket 6.

In the case of such a conventional lamp, however, since the body lens unit 1 essentially consisting of the lamp body portion 2 and the front lens portion 3 is formed by blow molding, the wall thickness of the peripheral edge portion 4a of the bulb fitting hole varies in the peripheral direction, and the annular gasket 7 protrudes from the flange portion 6a at the time the bulb 5 is fitted into the bulb fitting hole 4, thus posing a problem arising from insufficient waterproofing.

More specifically, as the hollow body lens unit 1 is formed by blow molding through the steps of supplying compressed air into a plastic parison to make the plastic material follow the molding surface by expanding the parison, there develops a variation in plate thickness (hereinafter called a deviation) between regions where the plastic material greatly expands and does not so much and such a plate thickness deviation becomes conspicuous in the lamp body portion 2 which is greatly expanded in particular. In other words, plate thicknesses t1 and t2 in the peripheral edge portion 4a of the bulb fitting hole 4 provided in the lamp body portion 2 differ from each other in the peripheral direction (t1<t2).

When the bulb 5 is fitted into the bulb fitting hole 4, furthermore, the presence of the plate thickness deviation makes compressive force acting on the gasket 7 on the thin-walled plate side smaller than what acts thereon on the thick-walled plate side, though compressive force acting thereon in the peripheral direction in any region remains constant when the plate thickness deviation is absent in the peripheral edge portion 4a of the bulb fitting hole 4. Since the transverse cross section of the gasket 7 is such that the wall thickness of the gasket 7 is gradually reduced toward the inner peripheral side, the compressive force causes the gasket 7 on the thick-walled plate side to protrude in particular, which results in insufficient waterproofing.

SUMMARY OF THE INVENTION

An object of the present invention made in view of the foregoing problems pertaining to the conventional art is to provide a vehicle lamp which is fitted with a gasket capable of insuring that a bulb fitting hole is sealed even though the plate thickness of the peripheral edge portion of the bulb fitting hole varies in the peripheral direction.

Another object of the invention is to provide a gasket for fitting with a bulb fitting hole of a vehicle lamp, capable of sealing the bulb fitting hole even though the plate thickness of the peripheral edge portion of the bulb fitting hole varies in the peripheral direction.

In order to accomplish the object above, a vehicle lamp according to the invention includes a container-like lamp body, a front lens provided in the front opening of the lamp body, a bulb as a light source fitted into a bulb fitting hole formed in the lamp body, and a waterproofing annular gasket fitted in between a flange portion provided on the periphery of a bulb socket portion and the peripheral edge portion of the bulb fitting hole, the lamp body and the front lens being integrally formed by blow molding and is characterized in that the gasket has such a transverse cross section that a radial length is set greater than a length in the direction in which compressive force acts and that parallel convex portions extending annularly in the peripheral direction toward at least one of the flange portion side and the side of the peripheral edge portion of the bulb fitting hole are provided in the radial direction.

The gap between the flange portion and the peripheral edge portion of the bulb fitting hole is sealed by the gasket provided therebetween and the tight contact area among the gasket, the flange portion and the peripheral edge portion of the bulb fitting hole is increased because the gasket has a such a transverse section that the radial length is set greater than the length in the width direction (the direction in which the compressive force acts), so that the sealability of the gap between the flange portion and the bulb fitting hole is improved. Moreover, the plurality of parallel convex portions provided in the radial direction on the surface of the gasket and extending annularly surround the bulb fitting hole and act as those improving the sealability of the gap between the flange portion and the peripheral edge portion of the bulb fitting hole.

If the plate thickness in the peripheral edge portion of the bulb fitting hole varies in the peripheral direction, the compressive force acting on the gasket on the thick plate side becomes greater than what acts thereon on the thin plate side when the bulb (the socket portion) is fitted into the bulb fitting hole by bayonet engagement and this causes the force of protruding the gasket on the thick plate side outward in the radial direction. However, the gasket which is long sideways in the radial direction is hardly likely to be deformed outward in the radially direction even though the compressive force acts thereon and unlikely to protrude from the flange portion to that extent. Furthermore, the parallel convex portions provided in the radial direction of the gasket are pressed against the flange portion and/or the peripheral edge portion of the bulb fitting hole, and the pressure-welding force resists against the force of protruding the gasket outward and acts so as to force the gasket to remain inside the flange portion.

A vehicle lamp according to another aspect of the invention is such that the gasket has such a transverse cross section that the convex portion on the flange portion side is set opposite to the convex portion on the side of the peripheral edge portion of the bulb fitting hole and arcs of the same size are formed continuously in the radial direction.

By the convex portions on the flange portion side and the opposing convex portions on the side of the peripheral edge portion of the bulb fitting hole, a plurality of annular pressure-welding surfaces having strong pressure-welding force and surrounding the bulb fitting hole are concentrically formed between the gasket and the flange portion and between the gasket and the peripheral edge portion of the bulb fitting hole to insure that the gap between the flange portion and the peripheral edge portion of the bulb fitting hole is sealed.

Moreover, the pressure-welding force generated both between the gasket and the flange portion and between the gasket and the peripheral edge portion of the bulb fitting hole resists against the force of protruding the gasket outward in the radial direction and acting the gasket as accompanied with the plate thickness deviation of the peripheral edge portion of the bulb fitting hole to insure that the gasket is forced to remain inside the flange portion.

A vehicle lamp according to another aspect of the invention is such that an inner peripheral surface chamfered to size matching the outer peripheral surface of the bulb socket portion is formed on the inner peripheral portion of the gasket.

As the external dimensions of the gasket can be reduced to an extent equivalent to chamfering the inner peripheral portion of the gasket, so that the external dimensions of the flange portion formed in the bulb socket portion become reducible to that extent.

A vehicle lamp according to still another aspect of the invention is such that a mold is used for forming the gasket in such a way that a parting line is positioned in the outer peripheral edge portion of a molded gasket body.

Even though traces such as parting line and gate marks of the mold and those produced after removal of burrs are left on the outer surface of the outer peripheral edge portio of the gasket, the gasket sealability remains unaffected because the outer peripheral edge portion of the gasket is a region which is not pressed against the flange portion and the peripheral edge portion of the bulb fitting hole (i.e., a region which does not function as a sealing portion).

DESCRIPTION OF THE PREFERRED EMBODIMENTS OF THE INVENTION

A preferred embodiment of the present invention will now be described with reference to accompanying drawings.

Figure 1:
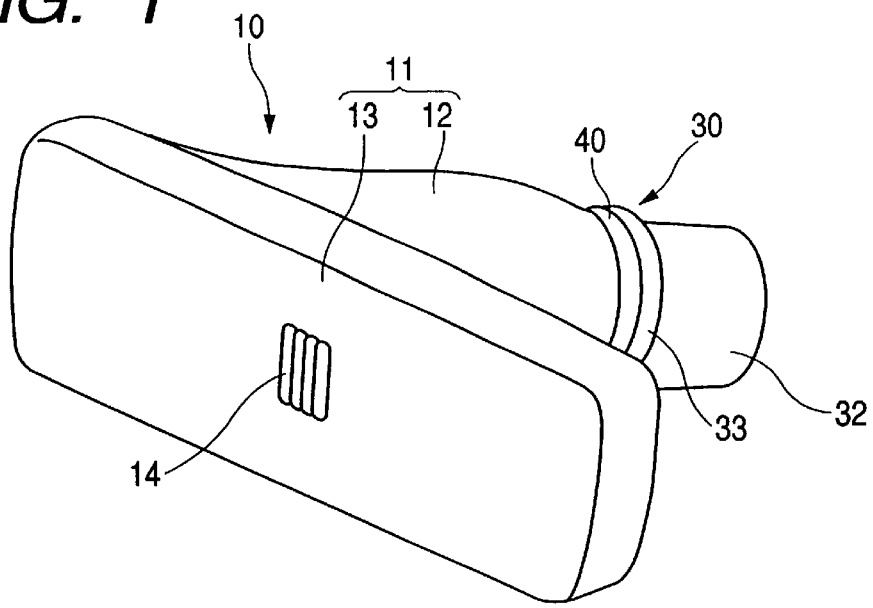
FIG. 1 is a perspective view of an automobile license plate lamp embodying the invention.
Figure 2:
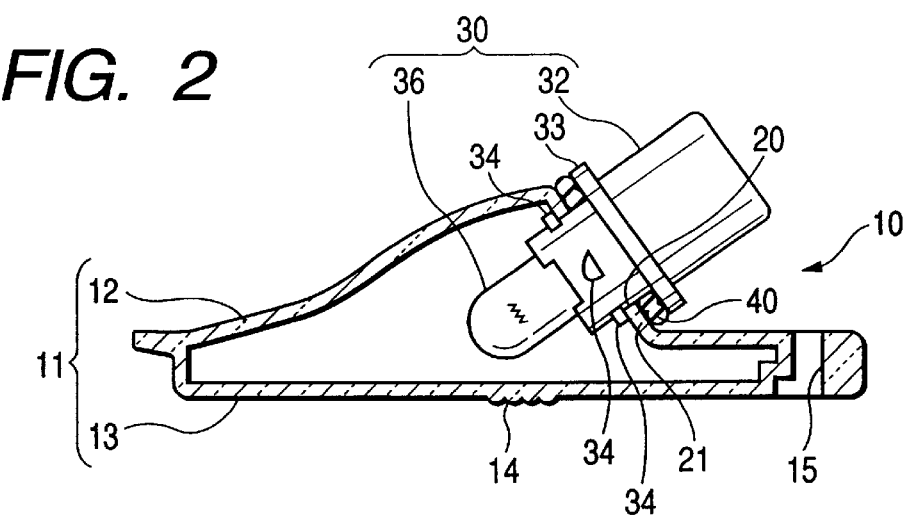
FIG. 2 is a horizontal sectional view of the lamp.
Figure 3:
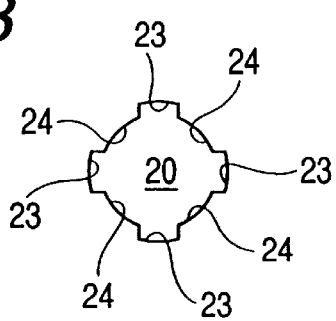
FIG. 3 is an elevational view of a bulb fitting hole.
Figure 4:
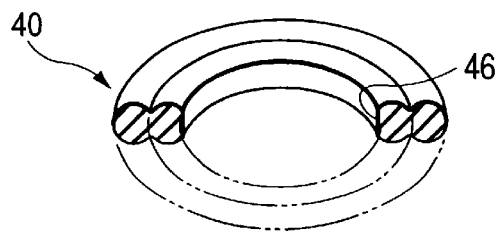
FIG. 4 is a perspective view of a gasket.
Figure 5:
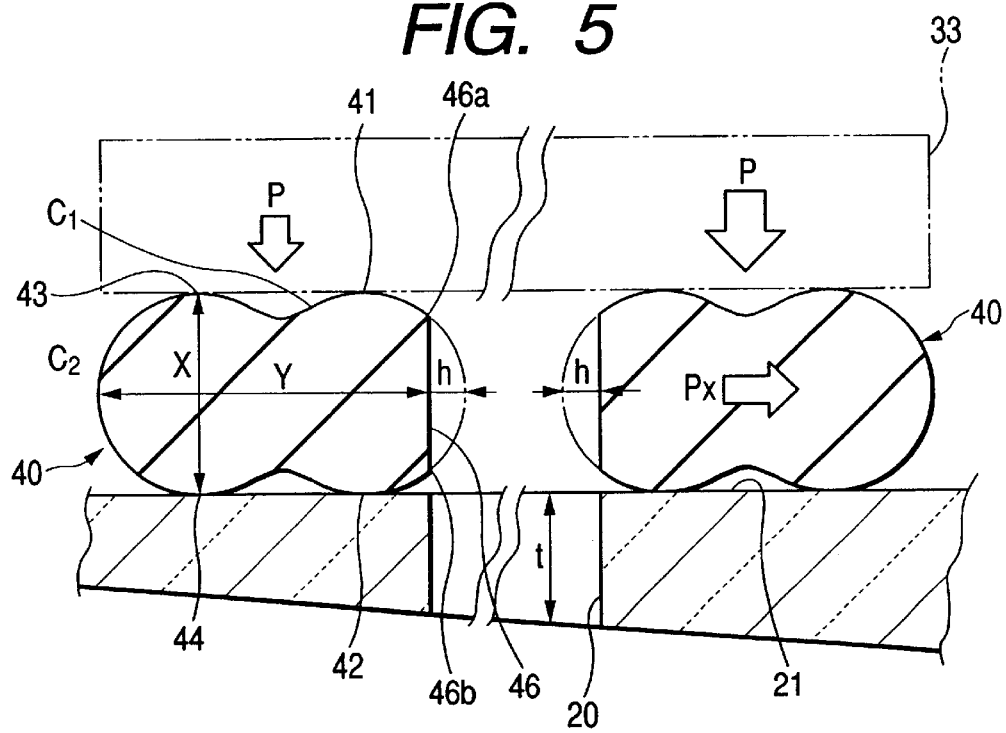
FIG. 5 is an enlarged sectional view of the gasket.
Figure 6:
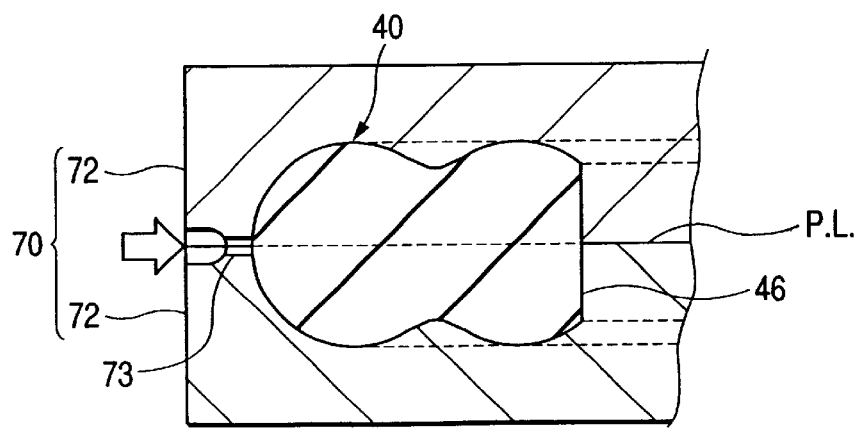
FIG. 6 is a sectional view of a mold for use in forming the gasket.
Figure 7:
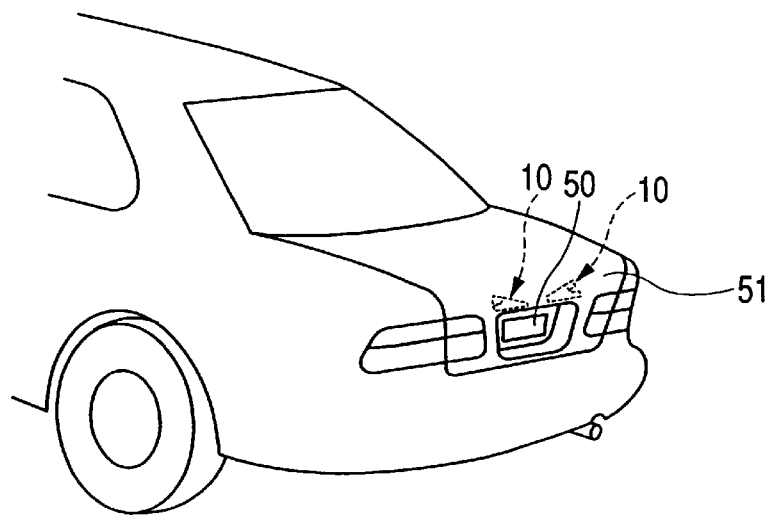
FIG. 7 is a perspective view of the rear portion of an automobile.
Figure 8:
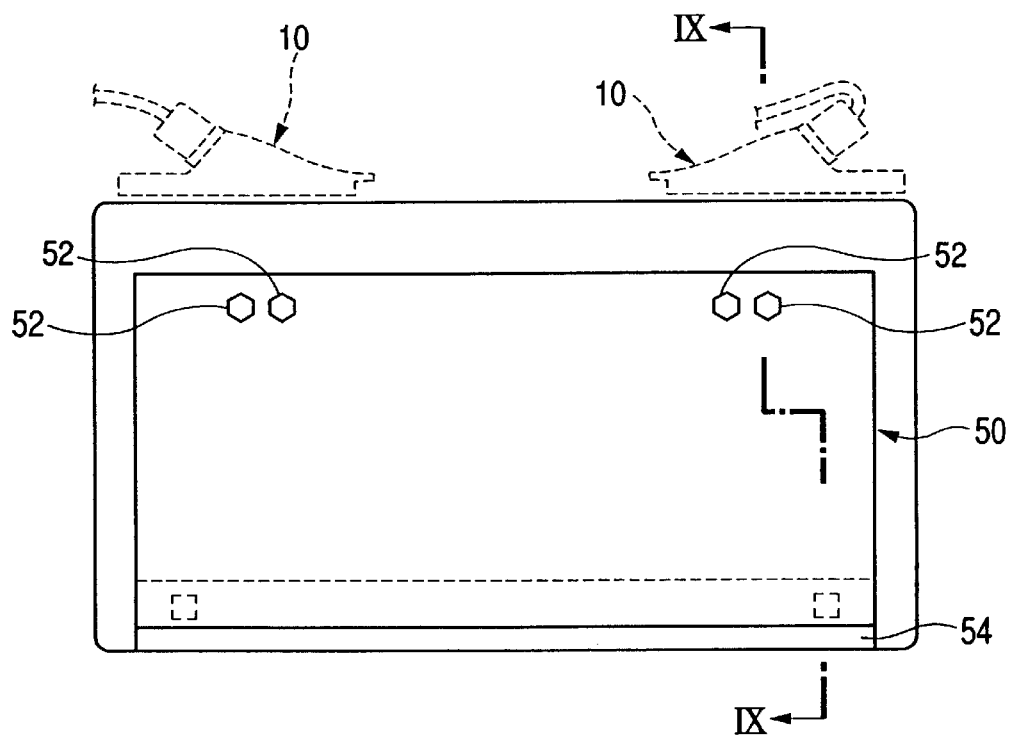
FIG. 8 is an elevational view of the periphery of a license plate in such a condition that the lamp has been fitted to a vehicle body.

FIGS. 1 through 9 show a first embodiment of the invention: FIG. 1 is a perspective view of an automobile license plate lamp; FIG. 2, a horizontal sectional view of the lamp; FIG. 3, an elevational view of a bulb fitting hole; FIG. 4, a perspective view of a gasket; FIG. 5, an enlarged sectional view of the gasket; FIG. 6, a sectional view of a mold for use in forming the gasket; FIG. 7, a perspective view of the rear portion of an automobile; FIG. 8, an elevational view of the periphery of a license plate in such a state that the lamp has been fitted to a vehicle body; and FIG. 9, a vertical sectional view taken along IX—IX of FIG. 8.

Figure 9:
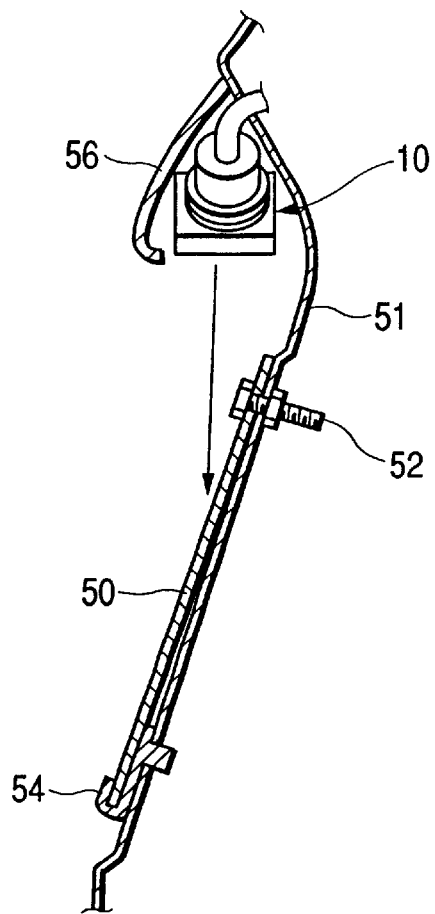
FIG. 9 is a vertical sectional view taken on line IX—IX of FIG. 8.

In these drawings, reference numeral 10 denotes an automobile license plate lamp, which is as shown in FIGS. 7–9 provided on both the left and right sides of an upper license plate 50 fixed to the rear end portion of an automobile so as to illuminate the license plate 50 from above.

Reference numeral 52 denotes bolts and nuts for use in fixing the license plate 50 to a vehicle body 51; 54, metal fittings fixed to the vehicle body 51 and used for carrying the license plate 50; and 56, a rear garnish which is fixed to the vehicle body 51 and used to cover the lamp 10.

The lamp body portion 12 and the front lens portion 13 of the license plate lamp 10 are integrally formed by blow molding into a hollow transparent body lens unit 11. Reference numeral 14 denotes cylindrical step elements for diffusing light emitted from the lens portion 13 to the left and right in order to lead the light to the license plate 50; and 15, a hole through which a clamping screw for fixing the lamp 10 to the vehicle body 51 is passed. Further, a bulb fitting hole 20 is formed by hollowing the flat area of the lamp body portion 12 of the body lens unit 11. A bulb 30 arranged by integrally fitting a wedge base bulb body 36 into a bulb socket 32 is fitted into the bulb fitting hole 20 by bayonet engagement.

More specifically, a flange portion 33 is provided around the outer peripheral surface of the bulb socket 32 and four engaging pawls 34 are projected close to the front end portion of the socket. An annular gasket 40 is fitted between the flange portion 33 and the engaging pawls 34. On the other hand, cutouts 24 capable of axially engaging with the respective engaging pawls formed on the bulb socket 32, and retaining projections 23 for retaining the respective engaging pawls 34 by engaging with the engaging pawls 34 in the peripheral direction are provided in the inner peripheral edge portion of the bulb fitting hole 20. The engaging pawls on the side of the bulb socket 32 and the cutouts 24 and the retaining projections 23 constitute a bayonet engagement portion.

Consequently, the socket 32 is forced into the bulb fitting hole 20 against the bouncing-back force of the gasket 40 by registering the engaging pawls 34 with the cutouts 24 and when the socket 32 is turned clockwise, the engaging pawls 34 are held in such a state that the engaging pawls 34 have been retained by the retaining projections 23 because of the bouncing-back force of the gasket 40, so that the engaging pawls are prevented from slipping off (the bayonet engagement portion is kept engaged). While the engaging pawls 34 are retained by the retaining projections 23 and kept from slipping off (the bayonet engagement portion is kept engaged), the socket 32 is turned counterclockwise against the bouncing-back force of the gasket 40 and when the engaging pawls 34 are so positioned as to be registered with the respective cutouts 24, the engaging pawls 34 are released from being retained by the retaining projections 23 (the bayonet engagement portion is released from engagement), whereby the socket 32 can be pulled out of the bulb fitting hole 20.

The gasket 40 provided between the flange portion 33 and the peripheral edge portion 21 of the bulb fitting hole has a transverse cross section such that as shown in FIGS. 4 and 5, a radial length Y is set greater than a length X in the thickness direction (the direction in which compressive force acts) and the tight contact area among the gasket 40, the flange portion 33 and the peripheral edge portion 21 of the bulb fitting hole is increased to that extent with the effect of improving gasket sealability.

Furthermore, the transverse cross section of the gasket 40 is such that two parallel circles C1 and C2 of the same size (outer diameter) are provided in the radial direction to form a gourd which holds part of each in common and vertically opposing arcuate convex portions 41, 42, 43 and 44 are extended in a concentrical fashion (annularly) at the thickest positions of the circles C1 and C2 which are pressed against the flange portion 33 and the peripheral edge portion 21 of the bulb fitting hole. Therefore, the gap between the flange portion 33 and the peripheral edge portion 21 of the bulb fitting hole is sealed by the two annular sealing portions, that is, a double sealing portion formed with the inside annular gasket portion in circular cross section as shown by the symbol C1 and the outside annular gasket portion in circular cross section as shown by the symbol C2 to insure that the gap between the flange portion 33 and the peripheral edge portion 21 of the bulb fitting hole is completely sealed.

In a case where plate thickness t in the peripheral edge portion 21 of the bulb fitting hole varies in the peripheral direction, compressive force P acting on the gasket 40 on the thick plate side becomes greater than on the thin plate side when the bulb 30 (the socket portion 32) is fitted into the bulb fitting hole 20 by bayonet engagement and the force $P_1$ of forcing the gasket 40 on the thick plate side outward is exerted thereto. Since the gasket 40 is radially long sideways in cross section, however, it is not so much deformed radially even though subjected to the compressive force. Furthermore, the convex portions radially provided in parallel are pressed against the flange portion 33 and the peripheral edge portion 21 of the bulb fitting hole, and frictional force in the double sealing portion resists against the force of protruding the gasket 40 and causes the gasket 40 to be held inside the flange portion 33. Consequently, the gasket 40 is not forced out of the flange portion 30 even though the peripheral edge portion 21 of the bulb fitting hole undergoes plate thickness deviation, so that waterproofing is insured longer.

Moreover, as a chamfered inner peripheral surface 46 matching the outer peripheral surface of the socket 32 is provided in the inner peripheral edge portion of the gasket 40, the external dimensions of the gasket 40 can be reduced to an extent equivalent to chamfering height h in the inner peripheral portion of the gasket 40, whereby the projecting dimensions of the flange portion 33 are made reducible to that extent.

Providing the chamfered inner peripheral surface 46 in the inner peripheral edge portion of the gasket 40 allows the arcuate convex portions 41, 42, 43 and 44 of the gasket 40 to be placed radially close to the inner side of the flange portion 33 in comparison with a case where no chamfered portions are provided and this structure would not let the gasket 40 protrude easily.

Providing the chamfered inner peripheral surface 46 results in forming corner portions 46a and 46b in the respective upper and lower side edge portions of the inner peripheral surface 46, thus solving the problem of causing the sealing portions of the integrated gasket to pull against each other.

The dimensions of the gasket 40 according to this embodiment of the invention includes an outer diameter of 25.2 mm, an inner diameter of 15 mm and an outer diameter of 3.2 mm of the arcs C1 and C2 of FIG. 5.

FIG. 6 is a sectional view of a mold for use in forming the gasket 40, which is arranged so that a parting line P. L. is positioned in the outer peripheral edge portion.

Therefore, even if traces of the parting line P. L of a mold 70 (top force 71 and bottom force 72) and a gate 73, traces resulting from removing burrs and the like are left on the outer surface of the outer peripheral edge portion of the gasket 40, the sealability of the gasket 40 (sealability of the gap between the flange portion 33 and the peripheral edge portion 21 of the bulb fitting hole) remains entirely unaffected because the outer peripheral edge portion of the gasket 40 is a region where the outer peripheral edge portion thereof will never be pressed against the flange portion 30 and the peripheral edge portion 21 of the bulb fitting hole (it will not function as a sealing portion).

Although the gasket 40 has such a transverse cross section that the two parallel circles C1 and C2 of the same size are provided in the radial direction in the way of holding part of each in common according to the aforementioned embodiment of the invention, it may have a transverse cross section such that more than two parallel circles are provided radially in the way of holding part of each in common.

Figure 10:
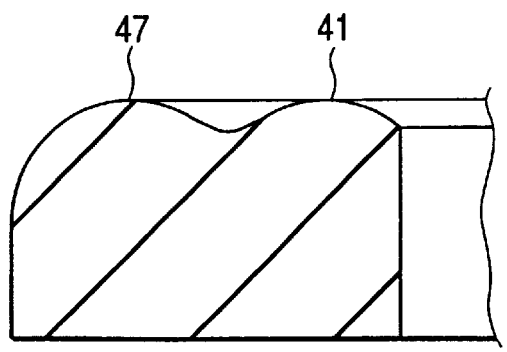
FIG. 10 is an enlarged sectional view of a modification of the gasket as the principal part of the automobile license plate lamp as the first embodiment of the invention.
Figure 11:
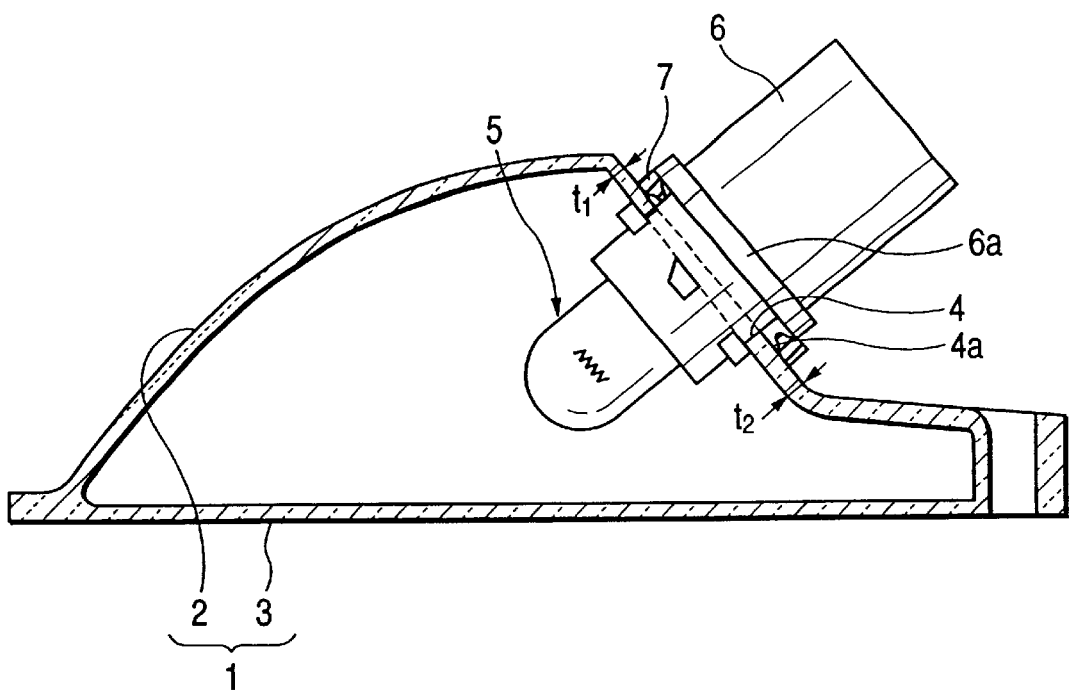
FIG. 11 is a sectional view of the periphery of the bulb fitting hole of a conventional lamp.

The transverse cross section of the gasket 40 may also be such that as shown in FIG. 10, arcuate convex portions 41, 43 are formed on either flange portion side or side of the peripheral edge portion of the bulb fitting hole.

Although an automobile license plate lamp has been described in the aforementioned embodiment of the invention, application of the present invention is not limited to the license plate lamp but the invention may widely be applicable to beacon lamps and any other vehicle lamps.

As is obvious from the description given above, the gap between the flange portion and the peripheral edge portion of the bulb fitting hole of the automobile head lamp is sealed with the plurality of sealing portions of the gasket and there is no fear of causing the gasket to protrude outward even though the plate thickness deviation is caused to the peripheral edge portion of the bulb fitting hole to insure that the bulb fitting hole is sealed effectively.

According to the invention, the gaps between the gasket and the flange portion and between the gasket and the peripheral edge portion of the bulb fitting hole are securely sealed to insure that the bulb fitting hole is sealed effectively further.

According to the invention, further, the bulb does not become large because the gasket and the flange portion are reducible in size.

According to the invention, moreover, even if traces of the parting line of the mold and the gate, traces resulting from removing burrs and the like are left on the outer surface of the outer peripheral edge portion of the gasket, the sealability of the bulb fitting hole is not impaired.

What is claimed is:

1. A vehicle lamp comprising:
    a container-like lamp body having a bulb fitting hole;
    a front lens coupled to a front opening of said lamp body;
    a light bulb fitted into the bulb fitting hole of the lamp body;
    a waterproofing annular gasket fitted between a flange portion provided on the periphery of a bulb socket portion and a peripheral edge portion of the bulb fitting hole, said lamp body and said front lens being integrally formed by blow molding, said gasket having a transverse cross section with a radial length greater than a length in a direction in which a compressive force acts, wherein said waterproofing annular gasket creates a waterproof seal between said flange portion and said peripheral edge portion in order to prevent water from entering into said lamp body; and parallel convex portions extending annularly in the peripheral direction toward at least one of the flange portion side and the side of the peripheral edge portion of the bulb fitting hole provided in the radial direction.

2. The vehicle lamp as claimed in claim 1, wherein said gasket has a transverse cross section so that a convex portion on the flange portion side oppose a convex portion on the side of the peripheral edge portion of the bulb fitting hole.

3. The vehicle lamp as claimed in claim 1, wherein an inner peripheral surface of said gasket is chamfered to match the size of an outer peripheral surface of the bulb socket portion.

4. The vehicle lamp as claimed in claim 1, wherein a mold parting line is positioned on an outer peripheral edge portion of said gasket.

5. The vehicle lamp according to claim 1, wherein the transverse cross section of the gasket comprises three overlapping circles having equal diameters, said circles being arranged side by side in the radial direction and wherein vertically opposing arcuate convex portions of said circles are pressed against the flange portion and the peripheral edge portion of the bulb fitting hole.

6. The vehicle lamp according to claim 1, wherein the transverse cross section of the gasket comprises two overlapping circles having equal diameters, said circles being arranged side by side in the radial direction and wherein vertically opposing arcuate convex portions of said circles are pressed against the flange portion and the peripheral edge portion of the bulb fitting hole.

7. The vehicle lamp according to claim 6, wherein the dimensions of the gasket include an outer diameter of 25.2 mm, an inner diameter of 15 mm and said circles have a diameter of 3.2 mm.

8. A gasket for sealing a bulb fitting hole of a vehicular lamp integrally formed with a front lens by a blow molding, wherein the gasket is fitted between a flange portion provided on the periphery of a bulb socket portion and a peripheral edge portion of the bulb fitting hole, said gasket having a transverse cross section with a radial length greater than a length in the direction in which a compressive force acts, wherein said gasket creates a waterproof seal between said flange portion and said peripheral edge portion in order to prevent water from entering into said lamp body of said vehicular lamp; and wherein the vehicular lamp comprises parallel convex portions extending annularly in the peripheral direction toward at least one of the flange portion side of the peripheral edge portion of the bulb fitting hole provided in the radial direction.

9. The gasket as claimed in claim 8, wherein said gasket has a transverse cross section so that a convex portion on the flange portion side opposes a convex portion on the side of the peripheral edge portion of the bulb fitting hole and arcs of the same size are formed continuously in the radial direction.

10. The gasket as claimed in claim 8, wherein an inner peripheral surface of said gasket is chamfered to match the size of an outer peripheral surface of the bulb socket portion.

11. The gasket as claimed in claim 8, wherein a mold parting line is positioned on an outer peripheral edge portion of said gasket.

12. The gasket according to claim 8, wherein the transverse cross section of the gasket comprises two overlapping circles having equal diameters, said circles being arranged side by side in the radial direction and wherein vertically opposing arcuate convex portions of said circles are pressed against the flange portion and the peripheral edge portion of the bulb fitting hole.

13. The gasket lamp according to claim 8, wherein the transverse cross section of the gasket comprises three overlapping circles having equal diameters, said circles being arranged side by side in the radial direction and wherein vertically opposing arcuate convex portions of said circles are pressed against the flange portion and the peripheral edge portion of the bulb fitting hole.

14. A gasket for sealing a bulb fitting hole of a vehicular lamp, said gasket having a shape comprising an outer toroidal ring and an inner toroidal ring, said inner toroidal ring being concentric with said outer toroidal ring, wherein an inside surface portion of said outer toroidal ring and an outside surface portion of said inner toroidal ring overlap.

15. A gasket according to claim 14 wherein said inner and outer toroidal rings have equal diameters.

16. A gasket according to claim 14 wherein an inner surface portion of said inner toroidal ring is flat.

* * * * *